(12) United States Patent
Huntley (10) Patent No.: US 10,857,550 B2
(45) Date of Patent: Dec. 8, 2020

(54) LOW PROFILE DUST SEPARATOR

(71) Applicant: Thomas Huntley, Auburn Hills, MI (US)

(72) Inventor: Thomas Huntley, Auburn Hills, MI (US)

( * ) Notice: Subject to any disclaimer, the term of this patent is extended or adjusted under 35 U.S.C. 154(b) by 244 days.

(21) Appl. No.: 15/465,051

(22) Filed: Mar. 21, 2017

(65) Prior Publication Data

US 2017/0266596 A1    Sep. 21, 2017

Related U.S. Application Data

(60) Provisional application No. 62/310,830, filed on Mar. 21, 2016.

(51) Int. Cl.

| | | |
|---|---|---|
| *B01D 45/08* | (2006.01) | |
| *B04C 1/00* | (2006.01) | |
| *B04C 5/081* | (2006.01) | |
| *B04C 5/185* | (2006.01) | |
| *B01D 45/12* | (2006.01) | |
| *B01D 45/16* | (2006.01) | |
| *B01D 45/00* | (2006.01) | |
| *B04C 5/103* | (2006.01) | |
| *A47L 9/16* | (2006.01) | |

(52) U.S. Cl.
CPC ............ *B04C 1/00* (2013.01); *B01D 45/08* (2013.01); *B04C 5/081* (2013.01); *B04C 5/185* (2013.01); *A47L 9/16* (2013.01); *A47L 9/165* (2013.01); *A47L 9/1608* (2013.01); *B01D 45/00* (2013.01); *B01D 45/12* (2013.01); *B01D 45/16* (2013.01); *B04C 5/103* (2013.01)

(58) Field of Classification Search
CPC ........... B04C 1/00; B04C 5/185; B04C 5/081; B04C 5/103; B01D 45/08; B01D 45/16; B01D 45/12; B01D 45/00-18; A47L 9/1608; A47L 9/165; A47L 9/16-19; B07B 7/08-10; B07B 13/11; B07B 13/116; E21B 43/34-40
USPC .......... 55/337, 413-416, 424-427, 434-465, 55/459.4, 459.5; 209/146-154; 210/787-789; 15/353
See application file for complete search history.

(56) References Cited

U.S. PATENT DOCUMENTS

| | | | | |
|---|---|---|---|---|
| 3,684,093 | A | * | 8/1972 | Kono ........................ B04C 5/02 |
| | | | | 210/788 |
| 4,090,956 | A | | 5/1978 | Benzon |

(Continued)

FOREIGN PATENT DOCUMENTS

| | | |
|---|---|---|
| EP | 2967269 B1 | 1/2016 |
| RU | 2088307 C1 | 8/1997 |

OTHER PUBLICATIONS

International Search Report and Written Opinion for Application No. PCT/US2018/022898, dated Jun. 1, 2018, 7 Pages.

*Primary Examiner* — T. Bennett McKenzie
(74) *Attorney, Agent, or Firm* — Brooks Kushman P.C.

(57) ABSTRACT

A dust separator including a top member having a top member having an inlet port arranged to supply dust-laden air and an outlet port arranged to remove clean air, the top member having a lower portion configured as a lip and having a radius which equals diameter of the inlet port, and a dust separator plate, housed within the lip, having a passage with at least one opening arranged to remove the dust from within the top member.

20 Claims, 7 Drawing Sheets

(56) References Cited

U.S. PATENT DOCUMENTS

| | | | | |
|---|---|---|---|---|
| 5,530,781 | A * | 6/1996 | Takahashi | G02B 6/2552 |
| | | | | 385/43 |
| 5,875,663 | A * | 3/1999 | Tateno | B21B 37/40 |
| | | | | 72/12.8 |
| 6,206,617 | B1 * | 3/2001 | Kawazoe | B23D 77/02 |
| | | | | 408/1 R |
| 6,210,457 | B1 | 4/2001 | Siemers | |
| 6,251,296 | B1 * | 6/2001 | Conrad | A47L 9/1683 |
| | | | | 210/806 |
| 6,746,500 | B1 * | 6/2004 | Park | A47L 9/1625 |
| | | | | 55/343 |
| 8,337,580 | B2 | 12/2012 | Manska | |
| 2002/0020154 | A1 * | 2/2002 | Yang | A47L 9/165 |
| | | | | 55/337 |
| 2004/0060146 | A1 * | 4/2004 | Coates | A47L 9/1608 |
| | | | | 15/347 |
| 2007/0199284 | A1 | 8/2007 | Yoo et al. | |
| 2010/0132317 | A1 * | 6/2010 | Thien | B01D 45/08 |
| | | | | 55/368 |
| 2012/0055125 | A1 | 3/2012 | Manska | |
| 2014/0223868 | A1 | 8/2014 | Kaufmann et al. | |

* cited by examiner

LOW PROFILE DUST SEPARATOR

CROSS-REFERENCE TO RELATED APPLICATIONS

This application claims the benefit of U.S. provisional application Ser. No. 62/310,830 filed Mar. 21, 2016, the disclosure of which is hereby incorporated in its entirety by reference herein.

TECHNICAL FIELD

The present disclosure relates to a particulate separator and a method of using the same to remove dust and debris from particulate-laden air.

BACKGROUND

Devices which use centrifugal force as a primary means of separating debris from dust-laden air are commercially referred to as cyclonic or centrifugal particulate collectors or separators. These particulate separators, often called dust separators, may be configured as part of an integrated system that includes a vacuum source and a particulate collection containment, and will often have a final filtration element. Alternatively, the dust separator may be an accessory item connected to a stand-alone shop vacuum of the type commonly used in garages, home work-shops, or small commercial businesses. An accessory dust separator is generally attached directly to a bucket, a drum, or other containment for collecting debris that is generally separate from any containment associated with the vacuum source, and which can be easily disconnected for proper disposal of its contents.

SUMMARY

In one embodiment, a dust separator is disclosed. The separator includes a top member having an inlet port for introduction of dust-laden air and an outlet port for removal of clean ai. The top member may have a lower portion configured as a lip and radius which equals diameter of the inlet port. The separator further includes a dust separator plate, housed within the lip. The separator plate includes a passage with at least one opening for removal of the dust from within the top member.

In an alterantvie embodiment, a dust separator is disclosed. The separator includes a top member defined by a circular outer wall and an inlet port with a diameter $d_1$ attached to the outer wall. The separator further includes a dust separator plate attached to the outer wall, the separator plate having a radius $r_1$ which equals $d_1$.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Dust separation may be the first of a two stage process where dust-laden air passes through a dust, or chip separator, and a majority of the larger particulates are separated from the air. The larger particulates are collected in a vessel attached to the separator, and later disposed. In stage two, the now substantially cleaned air exits the dust separator and flows into the containment of the shop vacuum where a second filtration process collects very fine particulates. The shop vacuum subsequently passes the clean air back into the environment.

Dust separators are sometimes delineated based on their separation efficiency. Devices that capture coarse dust and larger debris for the purpose of prolonging the cycle time between shop vacuum containment and filter cleanings may be referred to as chip separators. High-efficiency dust separators are typically devices that capture at least 99% of all debris and particulate matter, including some small particles invisible to the naked eye called fines. While both are effective at minimizing the need to occasionally service the vacuum's filter, consumers that purchase high-efficiency dust separators may want to improve the quality of air they breathe by also separating and collecting fines.

Breathing in very small particulates, or fines, has been associated with respiratory related illnesses, and is now a health concern of many. High Efficiency Particulate Arrestance filters, or HEPA filters, are generally considered to be the best measure of protection against pollution-induced respiratory illness because they are very effective at filtering fines from moving air. HEPA filters can be expensive and tend to clog quickly when used in workshops or industrial environments where dust production is unusually high. Therefore, high efficiency dust collectors, or those that capture at least 99% of incoming particulate matter, may be used in conjunction with HEPA filters as part of an air purification strategy intended to eliminate as many fines as possible. When HEPA filters are used in conjunction with a high-efficiency separator, the frequency of servicing or replacing a HEPA filter is greatly reduced.

When first introduced to the consumer market, dust separators were primarily used to capture most of the dust and debris before the air was drawn onto the containment of a shop vacuum. The process of emptying a shop vacuum may often require taking the shop vacuum to a suitable, open area where small amounts of exposed and unwanted dust are carried away in the atmosphere when the lid of the shop vacuum's containment is removed. Emptying of the shop vacuum containment is usually followed by a thorough cleaning of a filter, a generally messy step needed to restore the loss of vacuum that can occurs as the shop vacuum's filter gets clogged by the captured dust.

Attaching a cyclonic dust separator with its own collection container is an effective way of removing most particulates from dust-laden air before it is drawn into a shop vacuum. The process of separating and collecting of dust ahead of the shop vacuum simplifies the disposal of dust and extends the time between filter cleanings. Unfortunately, most devices used for this type of separation are not capable of capturing the minute particles of dust, called fines, that may be responsible for environment-related health issues. Dust separators that are not specifically designed to capture fines are generally referred to as chip collectors. Hereinafter, the term "dust separator" is intended to refer to a device generally known as a high-efficiency cyclonic particulate separator.

More recently, consumers and professionals have become aware of the need to protect their health by improving the quality of the air they breathe. Government agencies may enforce clean-air laws intended to protect workers in areas where dust production is common within a place of business. Often, small workshops, whether operated as a business or owned by hobbyists, are generally overlooked. Recent studies have found that the types and amount of dust present in the small workshops presents a serious health risk to a sizable population. The historical approach of connecting a chip collector to a shop vacuum does little, if anything, to improve air quality because fines are not filtered from the air. Shop owners and hobbyists who are aware of the potential health risks associated with fines are now seeking efficient devices for cleaning the air they breathe.

As consumer demand for improved air quality continues to grow, more options are becoming available which are intended to improve air quality in small workshops. An example choice for efficiently removing dust and debris from dusty air has historically been a cone-shaped, cyclonic dust separator.

Cyclonic separators can be very bulky and impose high spatial demands in a shop setting. Cone-shaped cyclonic separators continue to be the preferred method for high-efficiency particulate separation because of their ability to remove fines from incoming air before that air passes through a HEPA filter. Unfortunately, the science supporting this design of cyclonic separators requires them to either shrink in diameter or grow in height, and sometimes both, as a means of improving their fines separation efficiency. As a result, relatively highly efficient cone-shaped separators are often located outside of buildings because they are taller than the building which is the source of the dust-laden air they are intended to clean.

Thus, the air volume specification of commercial collectors can make this type of separator expensive to purchase and operate. Also, the design of the high-efficiency cyclonic separators results in devices that can be too tall for placement in many workshops. Indeed, the problem with siting a cone-shaped cyclonic separator usually relates to its height. Workshops that have difficulty placing a cone-shaped separator tend to rely on other devices such as HEPA filters which are also relatively expensive and require frequent servicing and/or replacement, as was mentioned above. Thus, consumers continue to seek alternative air cleaning solutions that are cost effective, easy to implement, and that provide a reliable, long-term solution for removing fine particles of unhealthy polluted dust from the air they breathe.

Accordingly, there is a need for a compact, highly efficient low-profile dust separator that can be used to remove particulates and small debris from dust-laden air that is affordable, durable, and can be put into operation with a minimal amount of site modification or adaptation. Also, this separator should have an operational efficiency that exceeds 99%.

In one or more embodiment, a high-efficiency dust separator having a low physical profile is disclosed. The present dust separator thus features a significantly different shape when compared to traditional cone-shaped cyclonic collection devices. The low physical profile relates to the height of the separator which is defined by the diameter of the inlet port. The separator is capable of removing more than 99% of debris, particles, fines, and a combination thereof from the dust-laden air supplied to the separator. The term clean air exiting the outlet port relates to air containing less than 1% of the debris, particles, fines, and the like which was supplied to the separator via the inlet port.

In one or more embodiments, a dust separator is disclosed. The dust separator is a cyclonic dust separator. The separator may have a low-profile shape. The dust separator utilizes centrifugal force and inertia to separate particulate matter from air. The separator is designed to be compatible with most shop vacuums commonly used to collect wood dust and debris that is a byproduct of woodworking.

While the description herein relates to the use of the dust separator in woodshops, the same principal, shape, and configuration may be increased to serve industrial systems. Thus, when scaled to greater dimensions, the presently disclosed design may make it possible to upgrade existing central shop vacuum systems to high efficiency particulate separators having performance on par with much taller cyclones.

Additionally, while this disclosure makes reference to wood dust and debris entrained in air, other types of dust and debris may also be separated in a similar manner by using various embodiments of the present disclosure. For example, the dust removable by the separator disclosed herein may include any dust particle including visible and invisible, floating and fallen particles of solid material. The debris, dust particles, particulate matter, the fines, and the like may have various sizes from about 1 μm up to the size of the maximum diameter of the inlet port, the width of the first end of the passage, or both. Examples of the dust include pollen, dust from various industrial productions including dust from polymeric materials, metal dust such as aluminum, steel, silicon, concrete, chalk, coal, sand, clay, rubber, leather, fiberglass, carbon fibers, brick, agricultural dust including grain dust, the like, or a combination thereof.

The present disclosure provides highly efficient separation of particulates from dust-laden air and may be made in a size that fits one or more standard cylindrical containers, or it may be scaled in size to fit variety of other types of containers. The present dust collector's compact size, simplicity of design, operational efficiency, reliability, and compatibility with multiple collection containers allows the dust separator to be used in a variety of settings where clean air is desirable. One example embodiment includes a low-profile dust separator positioned on top of a bucket and being connected by a hose to a consumer-type shop vacuum. Other applications relating to a variety of non-commercial and commercial applications are anticipated.

Figure 1:
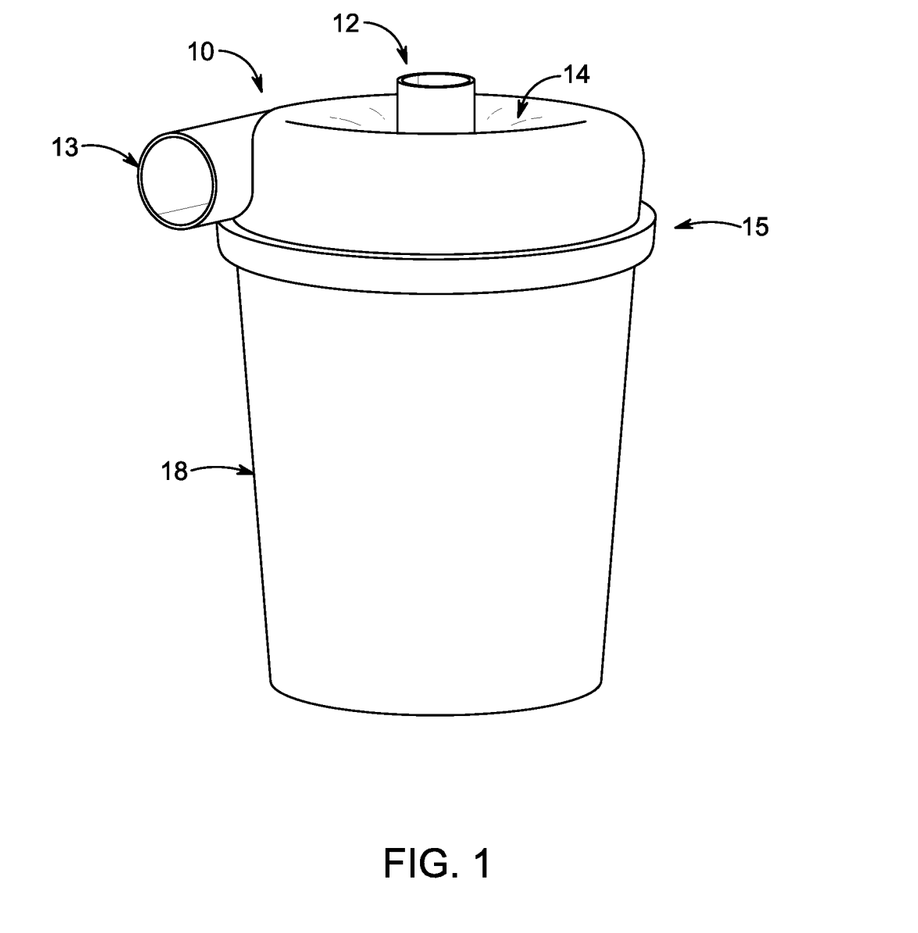
FIG. 1 depicts a perspective view of an exemplary embodiment of the low-profile cyclonic dust separator located above a collection container according to one or more embodiments.

The dust separator includes a top member and a separator plate. As can be seen in FIG. 1, the dust separator 10 includes a top member 11. The top member 11 includes an inlet port 13 with an opening or chamber opening 17 leading into a cyclonic chamber 14. The top portion also includes a lip or ledge 15 in its lower portion. The lip 15 extends beyond general periphery of the top member 11. The top member 11 further includes an outlet 12 which may be connected by a hose to a source of vacuum which is often a shop-vacuum (not depicted). The inlet 13 and outlet 12 have circular cross-sections. The dust separator 10 may be placed on a collection container 18 positioned beneath the separator 10 where the separated dust and debris can fall and are held by gravity. The collection container 18 may be any container capable of holding dust and debris. An example collection container 18 may be a bucket. The outer diameter of the separator 10 and of the collection container 18 may be the same or substantially similar to enable attachment of the separator 18 onto the collection container 18.

The dust separator 10 and the collection container 18 may form a generally airtight seal and may be held together by vacuum imparted from a vacuum source or by an attachment mechanism. The attachment may be loose or tight, temporary or permanent. The attachment may be secured by a variety of ways, for example by snapping the dust separator 16 onto the collection container 18. The dust collector 10, the collection container 18, or both may include one or more attachment devices. The one or more attachment devices may include hooks, brackets, a snap-fit mechanism, interlocking features, clips, clamps, quick-release fasteners, springs, the like, or a combination thereof. The separator 10 and the collection container 18 attachment may be provided in a way enabling easy removal and reattachment to help facilitate emptying of the collection container and disposing of its contents.

Figure 2:
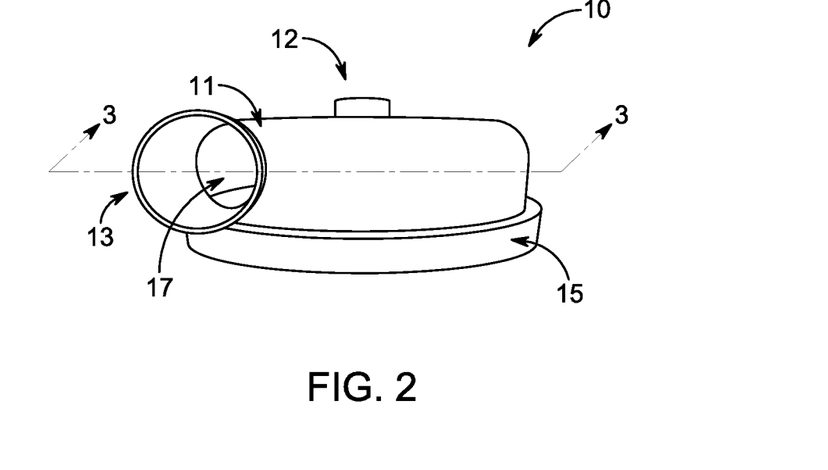
FIG. 2 depicts a top view of the low-profile cyclonic dust separator depicted in FIG. 1.
Figure 3:
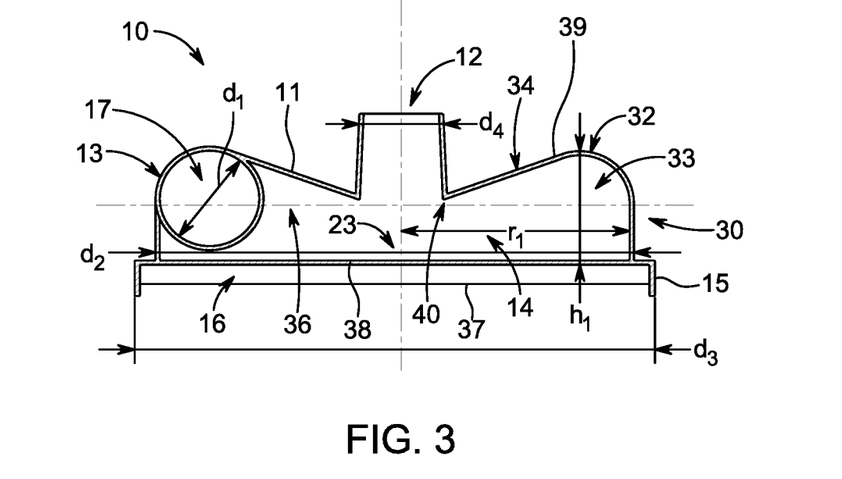
FIG. 3 depicts a cross-sectional view of the low-profile cyclonic dust separator depicted in FIG. 1 along the line 3-3.

FIG. 3 depicts a cross-sectional view of the dust separator 10 depicted in FIG. 2, which offers an alternative view of the same dust separator 10, depicted in FIG. 1 without the collection container 18. As can be seen in FIGS. 2 and 3, the cyclonic chamber 14 is defined by the volume of space contained between the separator plate 16, housed within the lip 15 of the top portion 11, and the top member 11 above the separator plate 16. The top member 11 includes an outer wall 30 having a curved surface with an arc 32 that attaches to an inverted frustum 34. The inverted frustum 34 forms an upper wall of the cyclonic chamber 14. The cyclonic chamber 14 is a low-profile cyclonic chamber which may have a maximum height equal to the diameter $d_1$ of the the inlet port 13. The height $h_1$ may exceed the diameter $d_1$. The cyclonic chamber 14 has a radius $r_1$ which may be equal to the diameter $d_1$ of the inlet port 13, of the opening 17, or both.

The outer wall 30 rises to meet a rounded surface having a cross-section that matches the circumference of the inlet port 13. The rounded surface may arch upward from the outer wall 30 to the top of the chamber 14 and may continue toward the chamber's center in an arc having a fixed radius to a point where it tangentially intersects the outer edge of the inverted frustum 34. The cyclonic chamber 14 and the inverted frustum 34 derive their center point from a ray that is perpendicular to the plane of the separation plate 16. The lower plane of the inverted frustum 34 is hollowed out to form a vortex locator 40 with a diameter similar to the inlet port 13, and that is configured as a part of the outlet 12. The outlet 12 is a clean air outlet. The outlet 12 originates from a plane established by the center line of the circular inlet port 13 and extends upward to a point that is equal to the maximum height of the chamber 14, lower, or higher. The vortex locator may be thus located on the center line of the circular inlet port 13.

The arc 32 at the top of the chamber 14 has a central point 33 derived from a radius equal to the radius of the inlet port 13. The height $h_1$ of the outer wall 30 with the curved surface having an arc 32 equals or is substantially close to the diameter $d_1$ of the inlet port 17. The inverted frustum 34 slopes towards the center of the top member 11 and ends with the vortex locator 40. The vortex locator 40 defines an opening of the outlet 12. The cyclonic chamber 14 thus has an outlet or output port 12 at its lowest point, which is at the center of spinning layer of air, or vortex, within the chamber 14.

The frustum's 34 inner surface or face 39 establishes the barrier on the upper portion of the chamber 14 which contains the cyclonic flow of air. The flow of air into the cyclonic chamber 14, around the chamber 14, and on to the outlet 12 is free of changes in contour which cause eddies in the flow of air. The chamber 14 has a continuous surface that guides air along a smooth chamber surface to a point where the air leaves the chamber 14 via the outlet 12.

The shape and configuration of the cyclonic chamber 14 is uniform throughout the circumference of the separator 10. The cyclonic chamber 14 has a circular shape or cross-section. The inner surface of the cyclonic chamber 14 is substantially smooth such that the particulate matter flows through the chamber 14 without or only with minimal obstructions. This configuration allows for reduction of eddy currents or turbulence caused by misalignment of surfaces which guide the flow of air through the dust separator 10. The presence of the inverted frustum 34 results in a region of lower pressure near the top of the chamber 14 where agglomeration of fines is more likely to occur.

Uniformity and smoothness of the cyclonic chamber 14 aids in achieving good separation. Particulates tend to stay suspended in a flowing volume of air when the air and particulates are all flowing in the same direction. When the general flow of air is caused to change direction, suspended particles have a tendency to continue moving in a straight line due to inertia and become separated from the general flow of air. Therefore, the force of inertia is the core physics principle at play in cyclonic or inertial dust separation system devices.

Any obstacle that perturbs the flow of a volume of air has a non-desirable impact on the linear travel of particulates suspended in volume of air. Sharp edges, square corners, mechanical connections of tubes, or any other obstruction that causes a sudden change in the flow of air may cause random currents of air or eddies to form, which can result in suspended particulates being scattered about. The separator 10 disclosed herein thus aims to minimize disturbances to the general flow of air to achieve optimum results of inertial separation.

Figure 4:
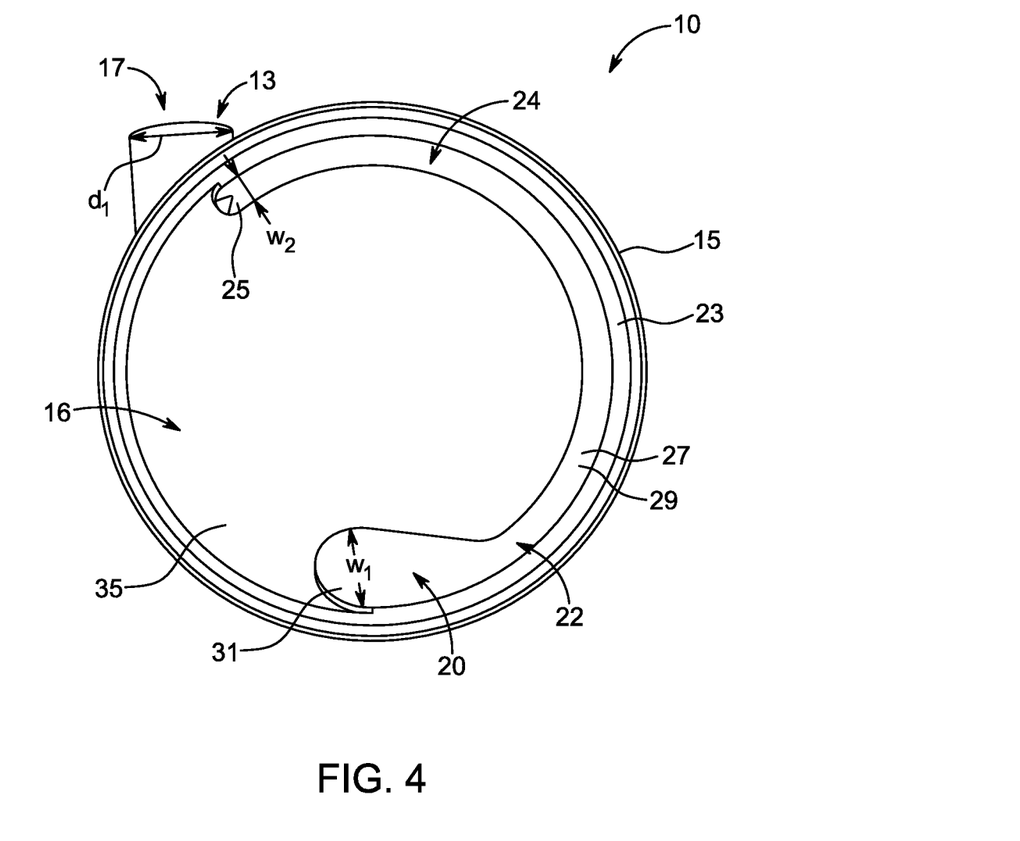
FIG. 4 shows a bottom view of the low-profile cyclonic dust separator depicted in FIGS. 1-3.

FIG. 4 shows a bottom view of the dust separator 10 having the separator plate 16 arranged within the lip 15 of the top member 11. The separator plate 16 has a generally flat surface that acts as a barrier between the cyclonic chamber 14 and a collection container 18. The separator plate 16 is intended to keep separated dust, which has passed into the collection container 18, from returning into the cyclonic flow within the chamber 14. The central point of the separator plate 16 lies on a ray 39 that is also central to the chamber 14, to the outlet 12, or both and perpendicular to the separator plate 16.

The separator plate includes a rim 23 and a main portion 35. The rim 23 and the main portion 35 may form integral portions of the separator plate 16. The rim 23 runs along the entire periphery of the lip 15. The width of the lip 15 may equal the width of the rim 23 to house, support, and/or accommodate the separator plate 16 within the lip 15 of the top member 11. The separator plate 16 may be temporarily or permanently attached to the top member 11. The connection of the separator plate 16 to the top member 11 may be exclusively via the rim 23. The separator plate 16 may be attached to the lip 15 mechanically, adhesively, by a snap-fit connection, by a mechanism described above, the like, or a combination thereof. The rim 23 may include threads enabling the separator plate 16 to be screwed into the lip 15 of the top member 11.

In at least one embodiment, the top member 11 is lip-free such that the outer wall 30 is flush with the lower portion of the top member 11. The separator plate 16 is housed within the outer wall 30 of the top member 11 instead of within the lip 15. The separator plate 16 may be attached adhesively, mechanically, snapped in place, inserted within a ridge formed in the lower portion of the outer wall 30 configured for the purposes of inserting the separator plate 16 within the material of the top member 11, by another method or device, or a combination thereof.

The main portion 35 may have an irregular shape defined by a tapered passage 22. The tapered passage 22 has varying dimensions throughout its length. The tapered passage 22 includes a wide portion 20 and a narrow portion 24. The wide portion 20 has a first end 31 arranged adjacent to or nearby to the point where the inlet 13 forms an opening 17 into the cyclonic chamber 14. The wide portion includes a second end 29, where the wide portion 20 narrows and where the width of the wide portion 20 is the smallest within the wide portion 20.

The narrow portion 24 includes a first end 27, located nearby to the point where the second end 29 of the wide portion 20 ends, and continues along the periphery of the lip 15 until the second end 25. The second end 25 of the narrow portion 24 may have a wider dimension than the remainder of the narrow portion 24 and form an enlarged opening. The location of the first end 27 of the narrow portion 24 may differ and is defined by the point at which the passage 22 or the wide portion 20 of the passage 22 starts to widen. The width of the wide portion 20 may increase in the direction from the second end 29 to the first end 31 of the second portion 20. The first end 31 of the wide portion 20 may form an enlarged opening. The enlarged opening may have a shape of a drop having an extended curved upper side. The first end 31 may define an opening proximal to the inflow of debris and particulate laden air. The first end 31 tapers towards the narrow portion 24 that allows smaller debris and fine particulates to exit the cyclonic chamber 14. As is explained later, particulates that enter the chamber 14 are acted upon by inertia and centrifugal forces which cause them to travel along the outer wall 30 of the chamber 14 until gravity and changes in air pressure within the cyclonic chamber 14 cause the particulates and other larger debris to leave the chamber 14 through a separator plate 16 having a larger opening at the point closest to where the air enters the chamber 14, at the first end 31. The separator 10 thus eliminates larger debris via an extended opening at the first end 31 and the finer particulates via a smaller opening at the opposite end of the passage, at the second end 25 of the narrow portion 24.

The first end 31 of the wide portion 20 may have a width $w_1$ approximately equal to, or slightly narrower than the diameter $d_1$ of the inlet 14. A width slightly smaller than the diameter of the inlet 14 may cause lower turbulence (compared to a width equal to the diameter of the inlet) as air enters the chamber 14, which in turn may improve fine particulate separation. The width of the wide portion 20 may increase in the direction from the second end 29 to the first end 31 of the second portion 20.

The narrow portion 24 has a smaller width than the width of the wide portion 20. The narrow portion 24 may have a constant width. The second end 25 of the narrow portion 24 may be slightly wider than the remainder of the narrow portion 24 and form an enlarged opening. The second end 25 of the narrow portion 24, has a width $w_2$, which may be about 25-30% of the diameter of the inlet 13 $d_1$.

Proper alignment of the wide end 20 of the tapered passage 22 with the flow of dust passing through the opening 17 causes most of the debris to quickly pass through the tapered passage 22 and into the collection container 18 below. The narrow end 24 allows other particulates to pass to the collection container 18 as they leave the cyclonic flow of air within the chamber 14.

The total length of the tapered passage 22 is about ½ to ⅔ the circumference of the chamber 14, or approximately 180 to 240 degrees. The location and dimensions of the tapered chamber 22 may be derived from empirical data based on the types of dust to be collected, i.e. wood, sand, metal, etc.

The separator plate 16 has a lower side 37 facing away from the top member 11 and a top side 38 facing towards the chamber 14 and forming the bottom portion of the chamber 14. The entire separator plate 16 may be solid. Both the lower side 37 and the top side 38 may have a smooth surface. The top side 38 may be smooth to minimize presence of obstructions and eddy currents the air encounters in the chamber 14.

Figure 5:
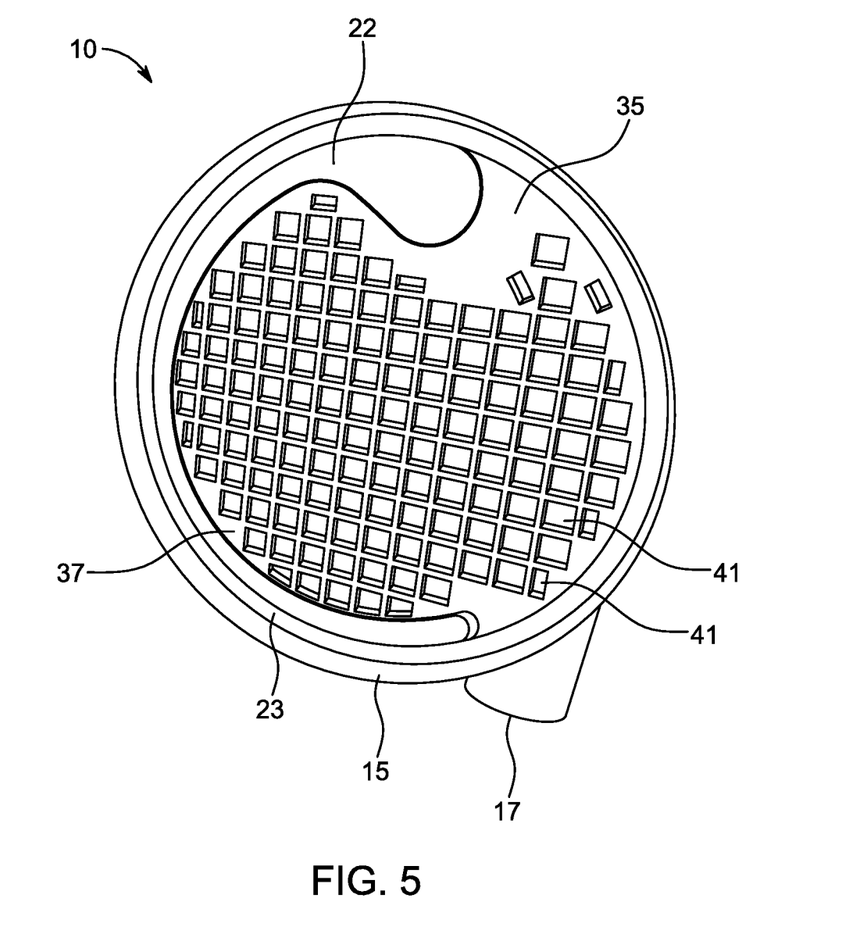
FIG. 5 depicts a bottom view of an alternative separator plate of the low-profile cyclonic dust separator.

Alternatively, the lower side 37 may include indentations 41, depressions, notches, the like, or a combination thereof, examples of which are depicted in FIG. 5. The indentations may have a regular or irregular shape. The indentations may include ridges. The cross-section of the indentations 41 may be square, rectangular, circular, semi-circular, oval, diamond, pentagon, hexagon, heptagon, octagon, nonagon. The cross-section, geometry, orientation, size, shape, and/or configuration of the indentations 41 may be different or the same throughout the lower side 37. The indentations 41 may be arranged in a pattern. The pattern may be regular or irregular. The indentations 41 may be arranged in rows. The depicted example pattern is a waffle pattern. The indentations 41 may be included to reduce the amount of material used to produce the separator plate 16. Presence of the indentations 16 should not compromise rigidity of the separator plate 16. The indentations 41 may serve an additional function such as reducing turbulence. For example, residual air turbulence may exist in the collection container 18. As the collection container 18 fills with separated material and debris, the air turbulence may cause re-entrainment of some particulate matter into the air stream within the system. Presence of the indentations 41 may reduce or eliminate the re-entrainment phenomenon. The lower side 37 may include one or more sections which are indentation-free. The rim 23 may be indentation-free.

Figure 6A:
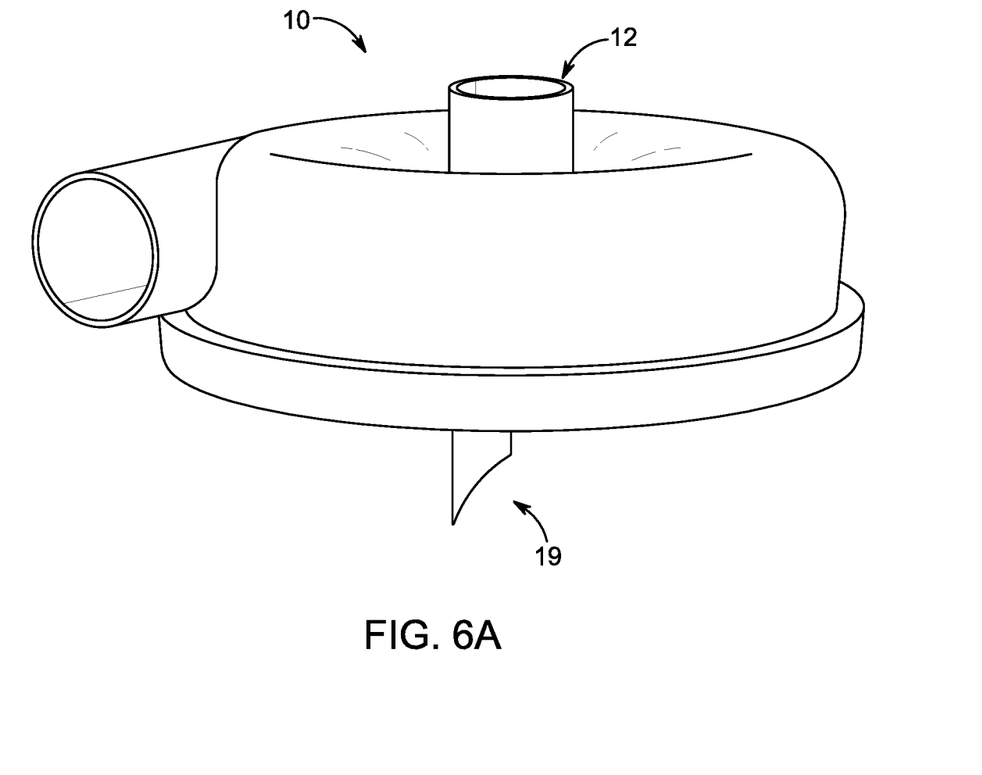
FIG. 6A shows a perspective schematic view of the outlet port having a deflector plate.
Figure 6B:
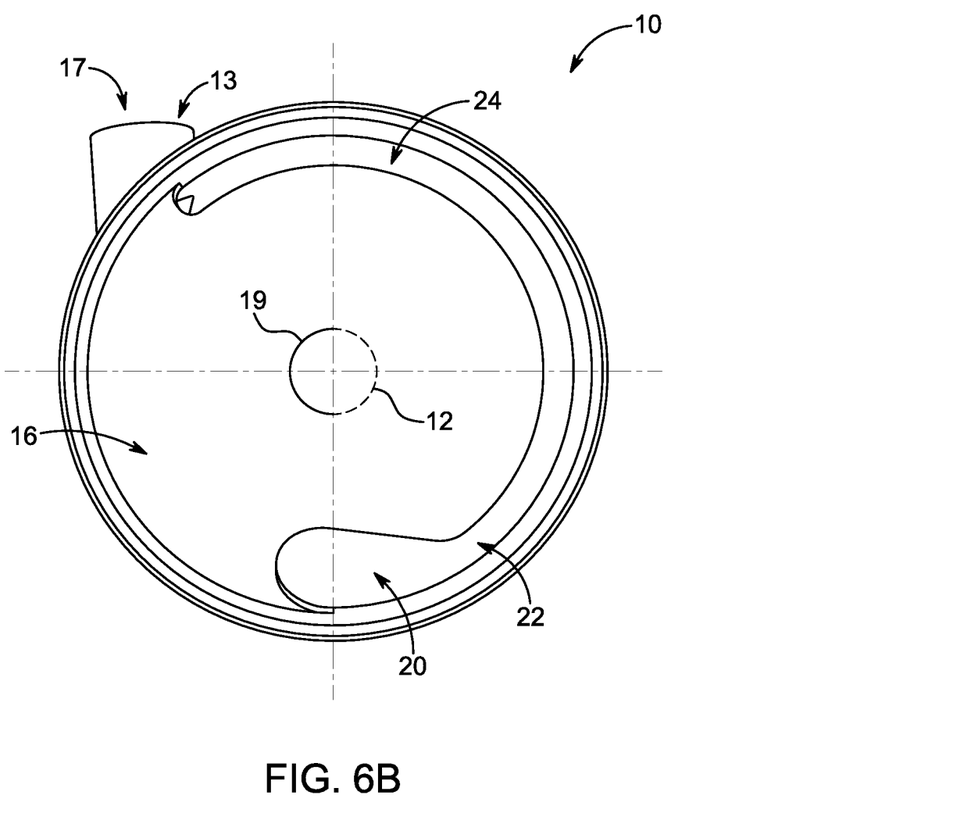
FIG. 6B shows a top view of the low-profile cyclonic dust separator having a deflector plate.

In one or more embodiments, depicted in FIGS. 6A and 6B, a deflector plate 19 may be an extension of the outlet port 12. The deflector plate 19 may run alongside a portion of the frustum 34. The deflector plate 19 may slope towards the separator plate 16. The deflector plate 19 may be an elongated, thin strip of a material. The shape of the deflector plate 19 may be rectangular, triangular, regular, irregular, the like, or a combination thereof. The deflector plate 19 may be configured along the outer periphery of the separator plate 16. The deflector plate 19 may be made from the same or different material as the top member 11, the separator plate 16, or both. The deflector plate 19 may be smooth. The deflector plate 19 may be flexible. The roughness of the deflector plate 19 may be greater or smaller than the roughness of the top side 38 of the separator plate 16 surface. The deflector plate 19 may strengthen the separator plate 16, improve the rigidity of the separator plate 16, eliminate undesirable deflection of the separator plate 16 in the direction of the outlet 12, support at least a portion of the separator plate 16, maintain the distance between the separator plate 16 and the output port 13, or a combination thereof. The deflector plate 19 may support a central portion of the separator plate 16. Additionally, the deflector plate 19 may improve separation performance. The deflector plate 19 may be an extension of the inlet 17.

Without limiting this disclosure to a single theory, it is believed that a relationship between the shape of the cyclonic chamber 14, presence of the inverted frustum 34, the tapered passage 22 in the separator plate 16, and the position of the chamber opening 17 enables to achieve separation efficiency exceeding 99%. The size, shape, and relative position of the tapered passage 22 may have an impact on the dust-separator's 10 ability to remove fines from incoming dust-laden air. The wide end 20 of the tapered passage 22 enables removal of larger debris soon after the debris enters the chamber 14 while providing additional time to the fines to agglomerate as they move around the chamber 14 in the cyclonic flow of air.

The tapered shape of the passage 22 from the second end 31 of the wide portion 20 to the first end 25 of the narrow portion 24 at the opposite end of the passage 22 minimizes turbulence within the chamber 14 and encourages formation of agglomerated fines. The type and size of the target media to be collected determine some of the adjustable parameters of the passage such as the size and placement of the wide portion 20, the degree of taper to the narrow portion 24, the termination of the narrow portion 24, the like, or a combination thereof. Thus, the specifications of the tapered passage 22 may be altered to optimize collection of fines having different specific gravities.

The size and shape of the inlet 13 should be compatible with the delivery vessel. The inlet 13 may be tubular. The inlet port 13 does not extend into the chamber 14. The inlet 13 terminates in the opening 17 at the point of intersection of the inlet port 13 with the chamber 14. The inlet 13, depicted for example in FIG. 4, is sized to provide a connection of a hose, tube, duct, or a like device to the top member 11. The dust-laden air enters the separator 10 via the inlet 13. Alternatively, a connection piece (not depicted) may be attached to the inlet 13. The connection piece may be adjustable such that hoses of different diameters may be connected to the separator 10. The inlet 13 should be positioned in a way that allows air to move into the separator 10 along a path that is tangential to the separator chamber 14. It is desirable to have all movement of air avoid sharp turns or other changes in surface conditions within the chamber 14 that could cause eddies, or air turbulence, that might impede separation efficiency. The opening 17 between the inlet 13 and the chamber 14 is derived from the intersection of the inlet 13 and the chamber 14 surfaces when mated together.

Dust-laden air may be forced by pressure through the hose which is connected to the inlet 13 of the separator 10, or it may be drawn through the inlet 13 by the presence of vacuum originating from an external source. A source of low pressure may be a shop vacuum, or some other network of ducting where low pressure exists as part of a central vacuum system. In operation, a pressure differential exists between the inlet 13 and the outlet 12. The pressure differential causes the dust-laden air to rapidly flow through the chamber 14 from which the dust exits at the outlet 12. Air flowing through the chamber 14 is caused to spin in a cyclone, which produces a vortex near the center of the chamber 14. As can be seen in FIG. 3, the outlet 12 is located in or near the center of the chamber 14, the top member 11, or both. The outlet 12 is arranged at a vortex locator 40 which is derived from and defined by the intersection of the outlet 12 with the inverted frustum 34. The frustum 34 and the center of the inlet 13 may be close to the same plane 36 for optimal separation.

Just like the inlet 13, the outlet 12 is sized to provide a connection of a hose, tube, duct, or a like device to the top member 11. Alternatively, a connection piece (not depicted) may be attached to the outlet 12, enabling connection of hoses of different diameters. The inlet 13 and the outlet 12 may have the same shape, size, dimension, configuration, the like, or a combination thereof.

The process of separating dust and debris from the air that carries the undesirable particulate matter starts at the intersection of the inlet 13 with the chamber 14 where the flow of air is caused to turn. Air tangentially enters the chamber 14 through its opening 17 and is forced to spin in a cyclonic fashion within the chamber 14. Particles having greater mass are then forced to move away from the center of the chamber 14 by the centrifugal force. Particles with greater mass are less affected by the buoyancy and tend to move quickly to the outer wall 30 of the chamber 14. Particulates carried by the cyclonic movement of air within the chamber 14 are constantly under the influence of centrifugal force. As very fines having lower mass agglomerate, the particulates continue to move away from the center of the chamber 14.

Eventually, the particulates will reach a point where centrifugal force and gravity forces them to fall through the tapered passage 22 into the collection container 18, if one is attached to the separator 10. Forces of gravity and inertia then act on the remaining particulates and debris, causing them to quickly exit the chamber 14 via the wide portion 20 of the tapered passage 22.

Smaller particles, commonly referred to as fines, may not respond immediately to the centrifugal force and therefore may remain at the top of the chamber 14, suspended in the circular flow of air along the face 39 of the inverted frustum 34. As these fine particles flow along the frustum's face 39, and move in the general direction of the outlet 12, the particles begin to agglomerate into larger particles having a greater mass. As the particles' mass increases, so does their response to the centrifugal force. The smaller radius of the air's rotation close to the vortex locator 40 combined with the higher mass of the now larger particles eventually causes them to break free of the air stream and move toward the outer perimeter of the cyclonic chamber 14. Upon reaching the outer wall 30, the now-agglomerated fines blend with larger incoming debris and are forced to pass through the tapered passage 22 and into the collection container 18 below. The particulates may enter the collection container 18 via any point in the passage 22.

Figure 7:
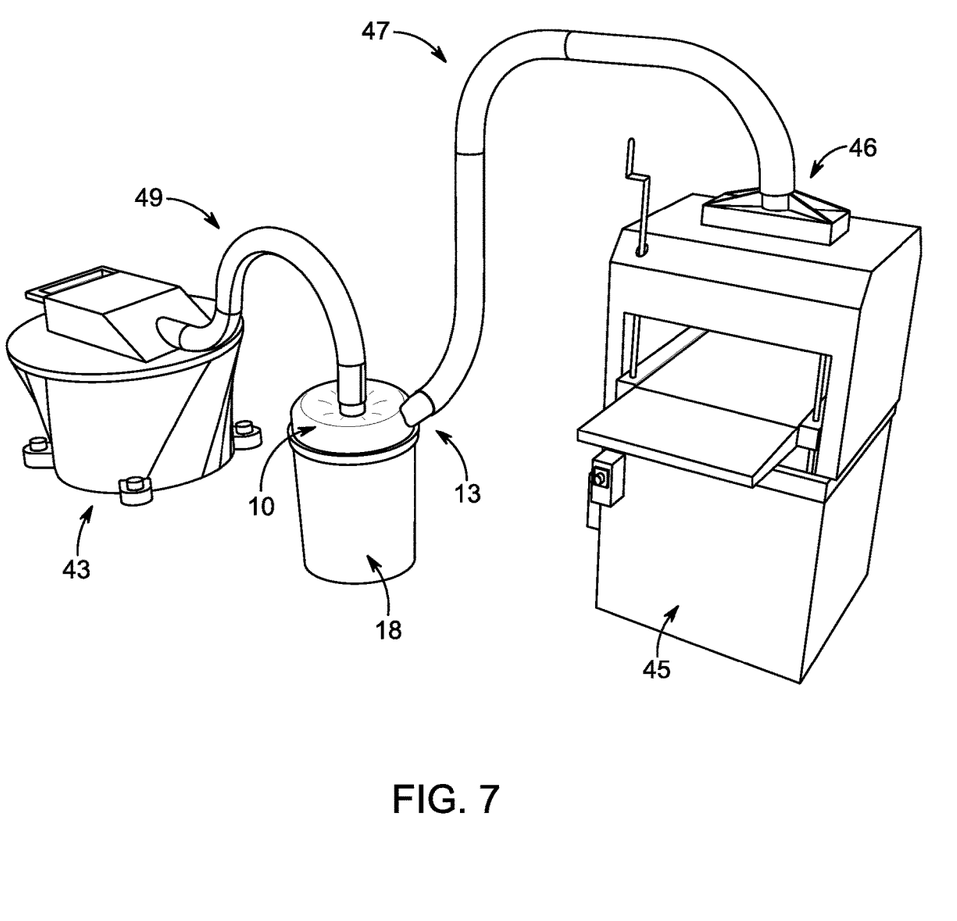
FIG. 7 illustrates an exemplary low-profile cyclonic dust collector depicted in FIGS. 1-6 connected to a tool generating polluted air and a shop vacuum.

FIG. 7 illustrates a non-limiting example of an application of the separator 10 in a woodworking shop. In FIG. 7, the separator 10 is arranged to collect dust and wood tailings from an example tool, a wood planer 45, before the air passes into the shop vacuum 43. In this, and other applications where a tool generating polluted air is used, a collection hose 47 may be used to carry effluent air from the tool 45 that is entrained with byproduct of the tooling operation. The dust-laden air moves through the collection hose 47 to the separator 10 via the inlet 13. The air, upon entering the cyclonic separator 10, is cleaned in a manner previously described, and then continues to the shop vacuum 43 via a delivery hose 49. Optimal dust collection is achieved when all couplings of the hoses to their respective attachments are snuggly fitted. Alternately, the distal end 46 of the collection hose 47 may be removed from the tool 45 and moved about manually to pick up loose dust and debris from various locations in the shop. Attaching the distal end 46 to a grill or grate (not depicted) that is located in an area where dust-laden air lingers may be an effective way to clean unmoving air that has become entrained with particulates.

The manner of dust separation described herein may have useful applications where the volume of air to be cleaned varies significantly. Therefore, the overall size of the separator 10 may need to be scaled to accommodate connections with larger collection and delivery hoses, ducts, or vessels used for moving air. For example, a separator which is used in conjunction with a shop vacuum may be connected to collection and delivery hoses with diameters of about 10 to $\frac{1}{16}$, 5 to $\frac{1}{8}$, or 2 to $\frac{1}{4}$ inches, or other sizes. The separator may have a diameter of about 8 to 25, 10 to 20, or 12-15 inches, or approximately about 5-6 times the diameter of the inlet. When the separator is used in conjunction with a central vacuum (not depicted), one might anticipate the need to connect to other inlets and outputs having diameters in the range of about less than about 1 to 10, 1.5 to 8, or 2 to 6 inches or more. These separators may work most efficiently if their diameter is adjusted to something in the about 40 to 10, 30 to 15, or 20 to 25 inches range. Actual dimensions are less important than are the ratios and placement of the operating elements of the dust separator.

The relevant ratios include a ratio of width $w_1$ of the first end 31 of the wide portion 20 of the passage 22 to the width $w_2$ of the second end 25 of the narrow portion 24 of the passage 22 in relation to the diameter $d_1$ of the input port 13, the output port 12, or both. The diameter $d_1$ of the input port 13 may equal, or be substantially the same as the diameter $d_4$ of the output port 12. $w_1$ may equal $d_1$ and/or $d_4$ while $w_2$ may equal about 15 to 35%, 20 to 30%, or 22 to 27% of $w_1$. $w_2$ may be about 25% of $w_1$. Another relevant ratio includes a ratio of the diameter $d_1$ of the input port 13, the output port 12, or both to the radius $r_1$ or diameter $d_2$ of the tubular member 11. The diameter $d_2$ of the tubular member 11 may equal the diameter $d_3$ of the separator plate 16. $r_1$ may equal $d_1$, $d_2$, and/or $d_3$ may equal two times $d_1$.

The top member 11, the separation plate 16, or both may be made from any suitable material. For example, the top member 11, the separation plate 16, or both may be made from polymeric material, metal, wood, ceramic, the like, or a combination thereof. For example, the polymeric material may be a thermoset or a thermoplastic. Example materials may include polyethylene, polypropylene, polycarbonate, polyurethane, polyamide, polyimide, polyvinylchloride, nylon the like, or a combination thereof. The top member 11, the separation plate 16, or both may be made from a biodegradable material. The top member 11, the separation plate 16, or both may be made from an anti-static material. The top member 11, the separation plate 16, or both may be made from a composite material including fibers. The fibers may be natural or synthetic fibers. The top member 11, the separation plate 16, or both may be made by any suitable method. The top member 11, the separation plate 16, or both may be made in one or more steps. The top member 11, the separation plate 16, or both may be made as one unitary compact piece or two separate pieces, for example by injection molding, blow molding, stamping, or the like. Alternatively, the top member 11, the separation plate 16, or both may be assembled from more than one piece. The top member 11, the separation plate 16, or both may be solid structures without any apertures besides the inlet 13, the outlet 12 of the top member 11 and the tapered passage 22 of the separator plate 16.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cyclonic particle separator comprising:
   a top member defined by a circular outer wall and an inlet port with a diameter $d_1$ extending from the outer wall; and
   a separator plate attached to the outer wall, the separator plate having a tapered passage tapering in a direction of fluid flow,
   wherein the separator plate includes an outer rim having walls extending in a first direction and a plate portion extending from the outer rim in a plane perpendicular to the first direction, and
   wherein the passage extends in a range of 180 degrees to 240 degrees along an inner perimeter of the outer rim.

2. The cyclonic particle separator of claim 1, wherein the passage is disposed in the plane between the plate portion and the outer rim.

3. The cyclonic particle separator of claim 1, wherein the passage has varying dimensions throughout its length.

4. The cyclonic particle separator of claim 1, wherein a lower surface of the separator plate defines an array of notches extending into the separator plate.

5. The cyclonic particle separator of claim 1, wherein a cyclonic chamber is defined by the top member and the separator plate and having a maximum height $h_1$ equal to or greater than the diameter $d_1$ of the inlet port.

6. The cyclonic particle separator of claim 1, wherein the top member further comprises an inverted frustum wall defining an upper wall of a cyclonic chamber, the cyclonic chamber having its center point derived from a ray perpendicular to the plane of the separator plate.

7. The cyclonic particle separator of claim 6, wherein the top member further comprises an outlet port arranged to remove clean air extending from the central rim of the inverted frustum wall.

8. The cyclonic particle separator of claim 7, wherein the outlet port comprises a deflector plate extending towards the separator plate.

9. The cyclonic particle separator of claim 6, wherein the inverted frustum wall slopes towards the center of the top member.

10. The cyclonic particle separator of claim 1, wherein a lower portion of the outer wall comprises a lip extending along an entire circumference of the top member.

11. The cyclonic particle separator of claim 10, wherein the separator plate is arranged in the lip.

12. A cyclonic particle separator comprising:
a top member defined by a circular outer wall and an inlet port with a diameter $d_1$ extending from the outer wall; and
a separator plate attached to the outer wall, the separator plate having a tapered passage tapering in a direction of fluid flow,
wherein the separator plate includes an outer rim having walls extending in a first direction and a plate portion extending from the outer rim in a plane perpendicular to the first direction, and
wherein the passage is a variable width passage defining a first distance between the plate portion and the outer rim at a first end of the passage, and a second distance between the plate portion and the outer rim at a second end of the passage, the second distance being different than the first distance.

13. The cyclonic particle separator of claim 12, wherein the first end of the passage is disposed proximate a fluid path defined by the inlet port to receive fluid flow from the inlet port.

14. The cyclonic particle separator of claim 13, wherein the passage defines an intermediate passage region disposed between the first end of the passage and the second end of the passage, wherein the intermediate passage region defines a third distance between the plate portion and the outer rim that is constant along the intermediate passage region.

15. The cyclonic particle separator of claim 12, wherein the first end of the passage forms an enlarged opening having an extended curved upper side.

16. The cyclonic particle separator of claim 12, wherein the first end of the passage has a width equal to or narrower than diameter $d_1$ of the inlet port.

17. The cyclonic particle separator of claim 12, wherein the second end is rounded, tapered, or both.

18. The cyclonic particle separator of claim 12, wherein a cyclonic chamber is defined by the top member and the separator plate and having a maximum height $h_1$ equal to or greater than the diameter $d_1$ of the inlet port.

19. The cyclonic particle separator of claim 12, wherein the top member further comprises an inverted frustum wall sloping towards a center of the top member and terminating with a vortex locator.

20. The cyclonic particle separator of claim 19, wherein the top member further comprises an outlet port arranged to remove clean air, the outlet port being defined by the vortex locator.

* * * * *